(12) United States Patent
Hua et al.

(10) Patent No.: US 12,498,599 B2
(45) Date of Patent: Dec. 16, 2025

(54) DISPLAY DEVICE

(71) Applicant: SHENZHEN TCL NEW TECHNOLOGY CO., LTD., Guangdong (CN)

(72) Inventors: Wei Hua, Guangdong (CN); Changnao Wang, Guangdong (CN); Zhenhua Zeng, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/717,433

(22) PCT Filed: Oct. 12, 2022

(86) PCT No.: PCT/CN2022/124964
§ 371 (c)(1),
(2) Date: Jun. 7, 2024

(87) PCT Pub. No.: WO2023/103579
PCT Pub. Date: Jun. 15, 2023

(65) Prior Publication Data
US 2025/0044626 A1    Feb. 6, 2025

(30) Foreign Application Priority Data
Dec. 10, 2021 (CN) .......................... 202123109871.1

(51) Int. Cl.
G02F 1/1333 (2006.01)

(52) U.S. Cl.
CPC .. *G02F 1/133314* (2021.01); *G02F 1/133317* (2021.01); *G02F 1/133385* (2013.01)

(58) Field of Classification Search
CPC ......... G02F 1/133314; G02F 1/133317; G02F 1/133385
See application file for complete search history.

(56) References Cited

U.S. PATENT DOCUMENTS

2014/0362328 A1* 12/2014 Kuroki ................. G02B 6/0093
349/58

FOREIGN PATENT DOCUMENTS

| CN | 206441048 U | 8/2017 |
| CN | 207010832 U | 2/2018 |
| CN | 207424439 U | 5/2018 |
| CN | 207833171 U | 9/2018 |
| CN | 108881761 A | 11/2018 |

(Continued)

OTHER PUBLICATIONS

International Search Report in International application No. PCT/CN2022/124964, mailed on Jan. 9, 2023.

(Continued)

*Primary Examiner* — Anne M Hines
(74) *Attorney, Agent, or Firm* — PV IP PC; Wei Te Chung

(57) ABSTRACT

Embodiments of the present disclosure provide a display device, comprising a display module. The display module comprises a back plate. A first accommodating part and a second accommodating part which are stacked and communicated with each other are formed on one side of the back plate. The first accommodating part is configured to accommodate a backlight component, and the second accommodating part is configured to accommodate a liquid crystal screen.

19 Claims, 4 Drawing Sheets

(56) References Cited

FOREIGN PATENT DOCUMENTS

| | | |
|---|---|---|
| CN | 209356789 U | 9/2019 |
| CN | 209486418 U | 10/2019 |
| CN | 111505853 A | 8/2020 |
| CN | 211293511 U | 8/2020 |
| CN | 113625481 A | 11/2021 |
| CN | 216901206 U | 7/2022 |
| WO | 2019071987 A1 | 4/2019 |

OTHER PUBLICATIONS

Written Opinion of the International Search Authority in International application No. PCT/CN2022/124964, mailed on Jan. 9, 2023.
European Office Action issued in corresponding European Patent Application No. 22903003.6 dated Oct. 17, 2025, pp. 1-8.

\* cited by examiner

DISPLAY DEVICE

This application is a US national phase application based upon an International Application No. PCT/CN2022/124964, filed on Oct. 12, 2022, which claims priority to Chinese Application No. 202123109871.1, entitled "DISPLAY DEVICE", filed on Dec. 10, 2021. The entire disclosures of the above applications are incorporated herein by reference.

FIELD OF THE INVENTION

The present disclosure relates to the field of display technology, specifically to a display device.

BACKGROUND

A display device is an electronic device that can display images, including televisions, monitors, and other types.

SUMMARY

Technical Problem

In related technologies, optical components such as backlight components and liquid crystal screens in display devices need to be installed and fixed with backplanes and plastic middle frames. The structure of the electronic device is relatively complex because many parts are required to be assembled, resulting in high material cost and low assembly efficiency.

Solution to Technical Problem

Technical Solution

The embodiment of the present disclosure provides a display device, which can simplify the installation and fixing structure of the optical component, reduce the material cost, and improve the assembly efficiency.

In some embodiments of the present disclosure, In some embodiments of the present disclosure, the backplate comprises a bottom wall and a side wall thereon; an inner surface of the side wall is provided with a flange portion that is opposite to the bottom wall; the bottom wall and the side wall are enclosed to form an accommodating cavity, and the flange portion separates the accommodating cavity into the first accommodating portion and the second accommodating portion.

In some embodiments of the present disclosure, the flanging portion is bent along a direction close to the bottom wall to form a folding structure.

In some embodiments of the present disclosure, the liquid crystal screen is arranged on one side surface of the folding structure far away from the backlight component, and the liquid crystal screen and the folding structure are bonded through an adhesive.

In some embodiments of the present disclosure, an upper part of the flange portion facing the bottom wall has a plane structure.

In some embodiments of the present disclosure, the folding structure is left with a gap.

In some embodiments of the present disclosure, one side of the flange facing the bottom wall is provided with a protective layer which is made of a Mylar sheet, a plastic layer, a rubber layer and a sponge layer.

In some embodiments of the present disclosure, one side of the flange facing the bottom wall is provided with a protective layer which is made of a Mylar sheet, a plastic layer, a rubber layer and a sponge layer.

In some embodiments of the present disclosure, a thickness of the protective layer ranges between 0.2 and 0.5 mm.

In some embodiments of the present disclosure, the display module has a display surface and a back surface that are relatively arranged; the back side of the display module is provided with a plurality of device mounting areas; the display device comprises a plurality of back shells correspondingly arranged in the plurality of device mounting areas; each of the back shells is provided with a device mounting portion, and the back shells and the device mounting area are enclosed to form a device mounting cavity.

In some embodiments of the present disclosure, the plurality of device mounting areas are defined on one side of the backplate far away from the display surface.

In some embodiments of the present disclosure, the plurality of device mounting areas are arranged in the downside area of the display module along its height direction, and the plurality of device mounting areas are sequentially arranged along a width direction of the display module.

In some embodiments of the present disclosure, one side edge of the back shell and the lower edge of the display module along its height direction are flush.

In some embodiments of the present disclosure, the surface of one side of the back shell, far away from the display surface, and the back surface of the display module are shared in a plane or a curved surface.

In some embodiments of the present disclosure, the display device further comprises a side frame, wherein the display module has a periphery surface connecting the display surface and the back surface, and the side frame is arranged on a periphery of the display module and an edge of the display surface.

In some embodiments of the present disclosure, the side frame is only arranged in a local area on the periphery of the display module.

In some embodiments of the present disclosure, the back shell and the side frame are buckled and connected.

In some embodiments of the present disclosure, the display device further comprises a driving circuit arranged on the periphery of the display module and a heat-dissipating sheet arranged between the driving circuit and the side frame.

In some embodiments of the present disclosure, the heat-dissipating sheet is made of a heat-dissipating material selected from at least one of a graphite sheet, a graphene film, a thermally conductive coating material, a ceramic material, a thermally conductive gel, and a phase-change material (PCM).

In some embodiments of the present disclosure, the backlight component comprises a backlight source on the backplate, and an optical film on one side of the backlight that is far away from the backplate.

Beneficial Effect of the Present Disclosure

Advantageous Effect

The embodiment of the disclosure discloses a first accommodating portion and a second accommodating portion that are arranged in layers and communicating with each other on the backplate, accommodating a backlight component by the first accommodating portion, accommodating a liquid crystal screen by accommodating a second accommodating portion; The assembly efficiency is increased, and the surface material of the display device is more consistent, which increases the appearance consistency.

BRIEF DESCRIPTION OF DRAWINGS

Description of the Drawings

In order to more clearly illustrate the technical solutions in the embodiments of the present disclosure, the drawings required to be used in the description of the embodiments will be briefly introduced below, and it is obvious that the drawings described below are only some embodiments of the present disclosure, and for those skilled in the art, other drawings can be obtained according to these drawings without creative labor.

Figure 1:
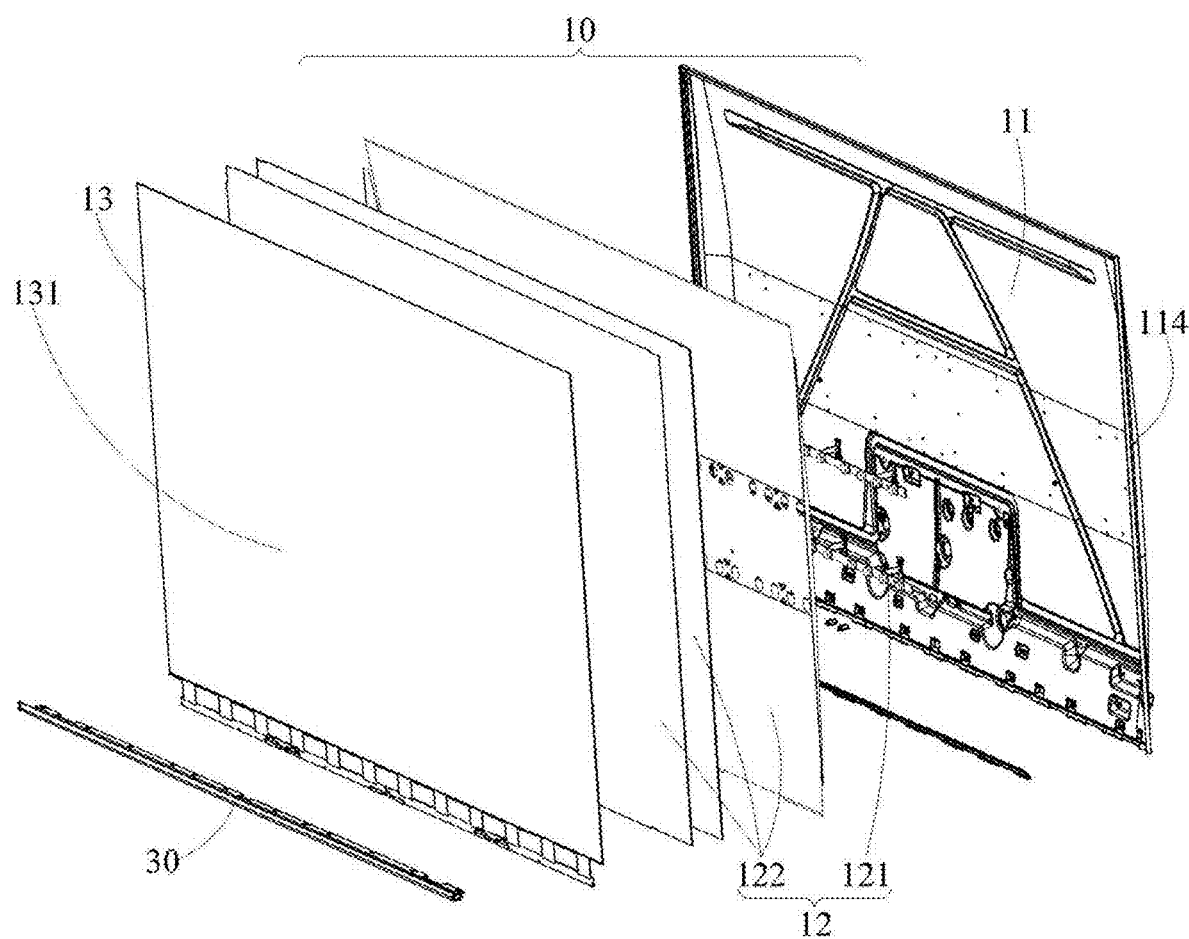
Figure 2:
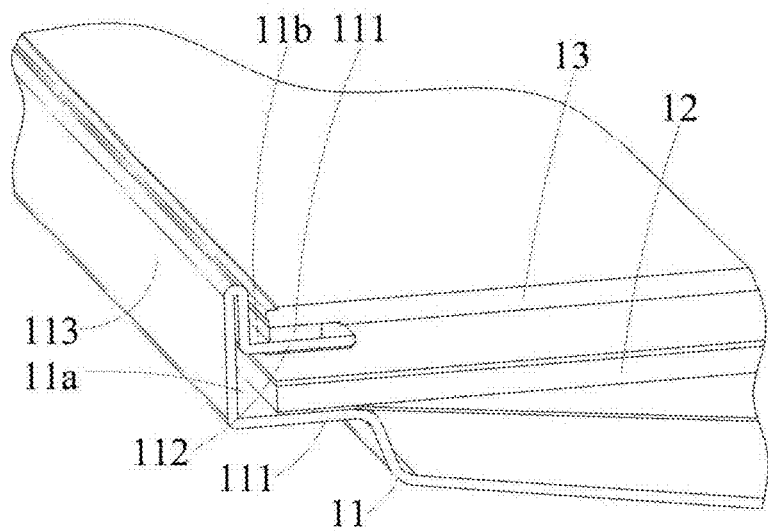
Figure 3:
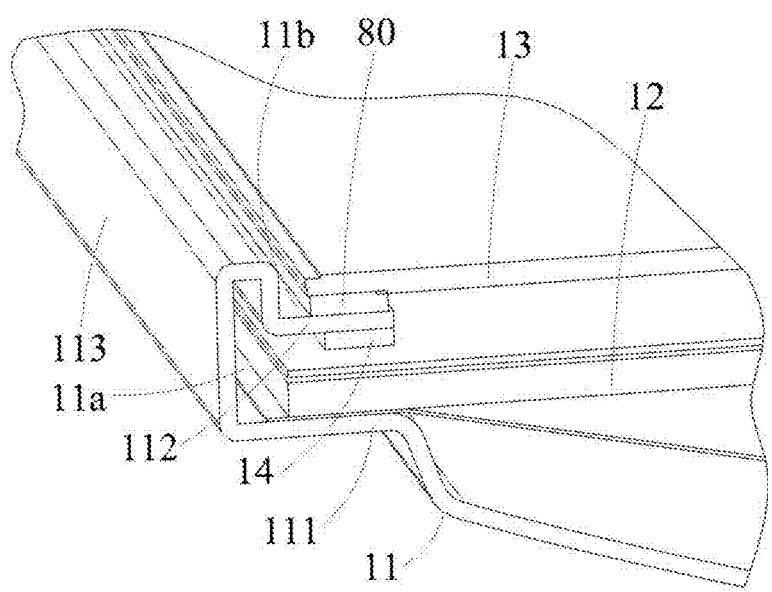
Figure 4:
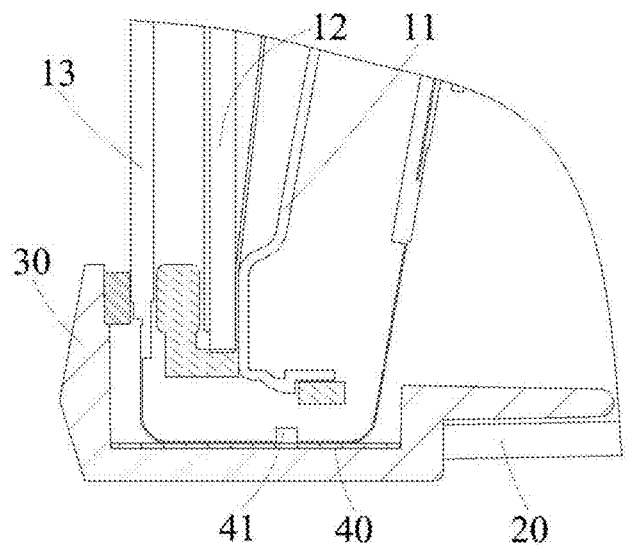
Figure 5:
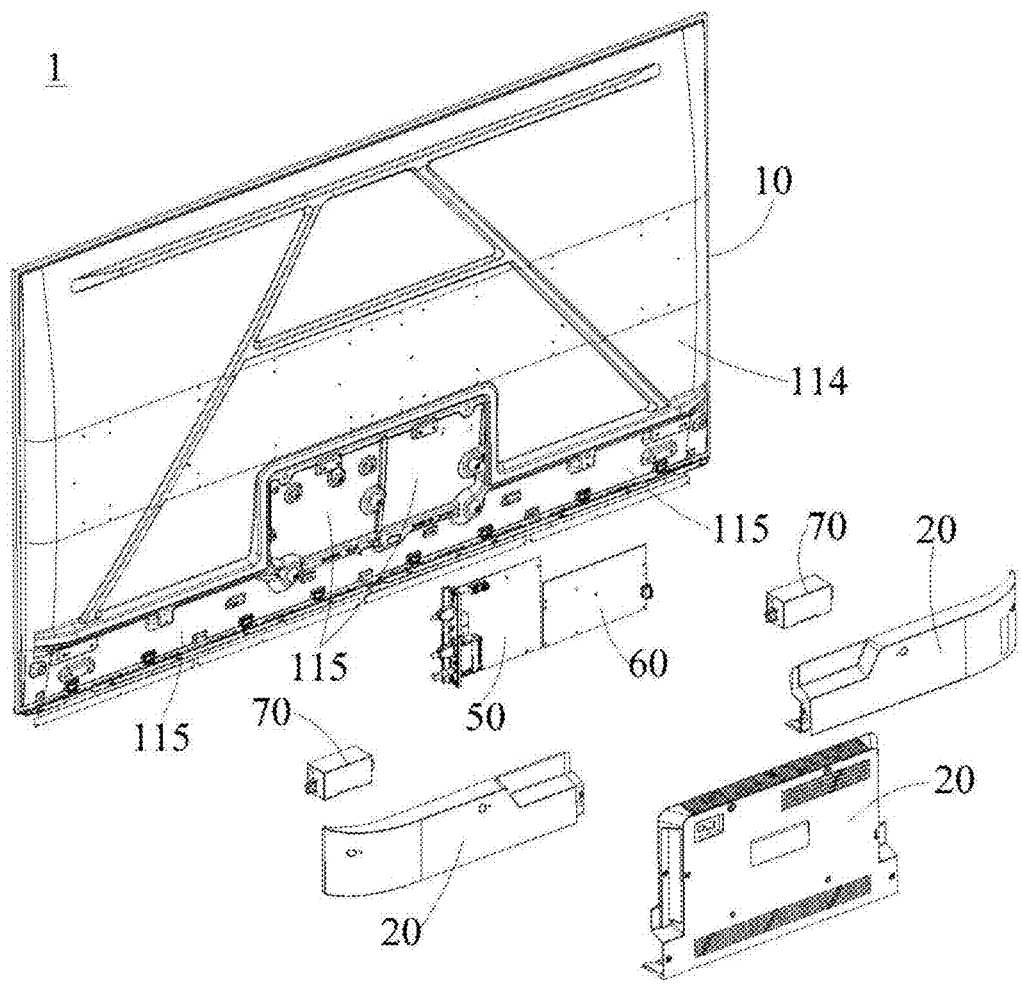
Figure 6:
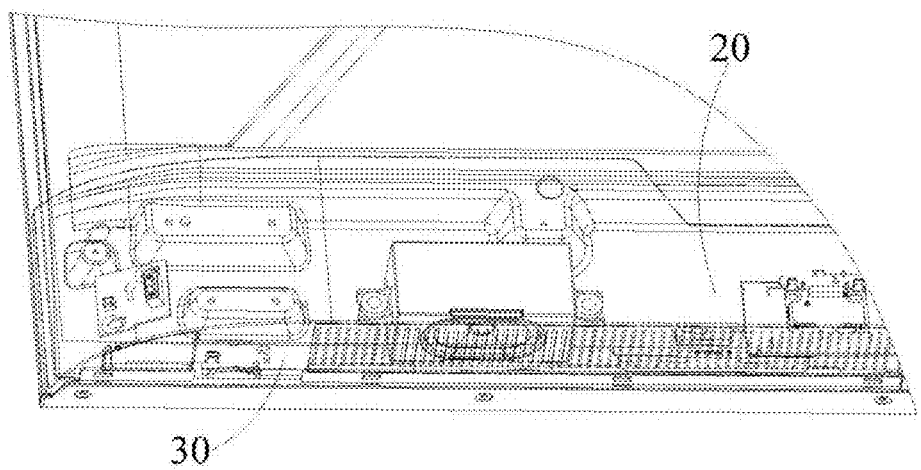

FIG. 1 is a local explosion structure diagram of the display device provided by some embodiments of the present disclosure;

FIG. 2 is a partial cross-sectional structure diagram of the display device provided by some embodiments of the present disclosure;

FIG. 3 is another partial cross-sectional structure diagram of the display device provided by some embodiments of the present disclosure;

FIG. 4 is another partial cross-sectional structure diagram of the display device provided by some embodiments of the present disclosure;

FIG. 5 is an overall explosion structure diagram of the display device provided by some embodiments of the present disclosure;

FIG. 6 is a partial perspective structure diagram of the display device provided by some embodiments of the present disclosure.

DESCRIPTION OF THE MAIN COMPONENT SYMBOLS

1—display device, 10—display module, 11—backplate, 111—bottom wall, 112—flange portion, 113—side wall, 114—rear surface, 115—device mounting area, 11a—first accommodating portion, 11b—second accommodating portion, 12—backlight component, 121—backlight source, 122—optical film, 13—liquid crystal screen, 131—display surface, 14—protective layer, 20—back shell, 30—side frame, 41—driving circuit, 40—heat-dissipating sheet layer, 50—motherboard, 60—power supply, 70—speaker, 80—adhesive

EMBODIMENT OF THE PRESENT DISCLOSURE

Detailed Description of the Present Disclosure

The technical solutions in the embodiments of the present disclosure will be clearly and completely described below in conjunction with the accompanying drawings in the embodiments of the present disclosure. It is obvious that the embodiments described are only part of the embodiments of the present disclosure, not all embodiments. Based on the embodiments in the present disclosure, all other embodiments obtained by a person skilled in the art without creative work fall within the scope of protection of the present disclosure.

In the description of the present disclosure, it is understood that the terms "center", "longitudinal", "horizontal", "length", "width", "thickness", "up", "down", "front", "rear", "left", "right", "vertical", "horizontal", "top", "bottom", "inner", "outer", etc., indicate orientations or positional relationships based on the orientations or positional relationships shown in the drawings and are for the convenience of description and simplification of the description, and do not indicate or imply that the apparatus or elements referred to must have a specific orientation, It is constructed and operated in a specific direction, and therefore cannot be construed as a restriction on this disclosure. In addition, the terms "first" and "second" are used for descriptive purposes only and should not be construed as indicating or implying relative importance or implying the number of technical features indicated. Thus, the features that are defined as "first" and "second" may explicitly or implicitly include one or more of the features described. In the description of this disclosure, "multiple" means two or more people, unless otherwise expressly and specifically qualified.

"A and/or B" includes the following three combinations: A only, B only, and a combination of A and B.

The phrase "suitable for" or "configured to" in the present disclosure implies open and inclusive language, which does not exclude devices that are applicable to or configured to perform additional tasks or steps. In addition, the use of "based on" implies openness and inclusiveness, since a process, step, calculation or other action "based on" one or more of the stated conditions or values can in practice be based on additional conditions or beyond the stated values.

In this disclosure, the term "exemplary" is used to mean "to be used as an example, illustration or illustration". Any embodiment described as "exemplary" in this disclosure is not necessarily construed as being superior or superior to the other embodiments. In order to enable any person skilled in the art to realize and use the present disclosure, the following description is given. In the following description, details are listed for the purpose of interpretation. It should be understood that a person of ordinary skill in the art can recognize that the present disclosure can be realized without the use of these specific details. In other cases, the structure and process of the public knowledge will not be elaborated in order to avoid unnecessary details obscure the description of this disclosure. Therefore, the present disclosure is not intended to be limited to the embodiments shown, but is consistent with the widest possible scope of the principles and characteristics disclosed in the present disclosure.

As shown in FIG. 1-FIG. 3, the embodiment of the present disclosure provides a display device 1. The display device 1 having a display module 10 can simplify the installation and fixing structure of optical components such as backlight component, liquid crystal screen, etc., reduce material cost, improve assembly efficiency. The display device 1 may be determined according to actual needs. The display device 1 may be but not limited to a television, a display, etc.

The display module 10 comprises a backplate 11, a backlight component 12 and a liquid crystal screen 13. The backplate 11 includes a first accommodating portion 11a and a second accommodating portion 11b that are arranged in layers and communicated with each other on one side. The first accommodating portion 11a is configured to accommodate the backlight component 12, and the second accommodating portion 11b is configured to accommodate the liquid crystal screen 13. The backplate 11 is an integral structure and includes the first accommodating portion 11a and the second accommodating portion 11b. In this way, under the condition of not adopting plastic middle frame, the installation and fixation of optical components such as backlight component 12 and the liquid crystal screen 13 can be realized by using the backplate 11 of integrated arrangement.

Since the number of parts is reduced, and the installation and fixing structure of optical components are simplified due to canceling plastic middle frame, material cost decreases and assembly efficiency is improved. In addition, compared with the inconsistency of the appearance materials caused by the use of a metal backplate and a plastic middle frame to form a shell in the related art, a better appearance consistency and integrity of the display device 1 is visible because only the backplate 11 is used without any plastic middle frame as the shell.

The structure of the backplate 11 may be decided according to actual needs, and the embodiments of the present disclosure are not limited to this. In some embodiments, the backplate 11 may comprise a bottom wall 111 and a side wall 113 thereon. An inner surface of the side wall 113 is provided with a flange portion 112 arranged relative to the bottom wall 111. The bottom wall 111 and the side wall 113 are enclosed to form an accommodating cavity. The flange portion 112 separates the accommodating cavity into the first accommodating portion 11a and the second accommodating portion 11b. In other words, the first accommodating portion 11a is defined by the bottom wall 111, the flange portion 112 and the side wall 113, while the second accommodating portion 11b is defined by the flange portion 112 away from the bottom wall 111 and the side wall 113. The bottom wall 111, the side wall 113 and the flange section 112 may be made in one piece by a one-piece molding process or by the welding/bonding process. In this way, the backlight component 12 can be reliably arranged in the first accommodating portion 11a. The rear side of the backlight component 12 is supported and protected by the bottom wall 111 of the backplate 11, the front side of the backlight component 12 is supported and protected by the flange portion 112, and the circumferential side of the backlight component 12 is supported and protected by the side wall 113, so that the backlight component 12 is not easy to damage and has high safety. The liquid crystal screen 13 can be reliably arranged in the second accommodating portion 11b, and the rear side of the liquid crystal screen 13 can be supported and protected by the flange portion 112, the circumferential side of the liquid crystal screen 13 can be protected by the side wall 113. For example, the backlight component 12 may comprise a backlight source 121 and an optical film 122. The backlight source 121 may be arranged on the backplate 11, and the optical film 122 may be arranged on one side of the backlight source 121 that is far away from the backplate 11.

In some embodiments, the flange portion 112 may be bent close to the bottom wall 111 to form a folding structure. The liquid crystal screen 13 can be arranged on one side surface of the folding structure away from the backlight component 12. In this way, the liquid crystal screen 13 can get the reliable support and good positioning of the folding structure. For example, the liquid crystal display 13 and the folding structure can be fixed with adhesive, so that the liquid crystal display 13 can be reliably installed. A containment groove portion defined by the flanging portion 112 located at each side may fit the liquid crystal screen 13 and support the liquid crystal screen 13. The liquid crystal screen 13 and the folding structure can be bonded by adhesive 80. For example, the flange subpart of the flanging portion 112 facing the bottom wall 111 may be a flat structure, which is easy to carry out mass production and reduce manufacturing costs.

Whether there is a gap when the folding structure is bent may be decided according to actual needs, and the embodiment of the present disclosure does not limit this. As shown in FIG. 3, when the expansion and contraction of the backlight component 12 changes greatly, the folding structure can leave the gap to meet the thermal expansion space needs of the backlight component 12 and avoid the collision damage of the backlight component 12 during expansion.

In some embodiments, one side of the flanging portion 112 facing the bottom wall 111 may be provided with a protective layer 14 which may be made of a Mylar sheet, plastic layer, rubber layer or sponge layer. In this way, when the backlight component 12 is arranged in the first accommodating portion 11a between the flange portion 112 and the bottom wall 111, the protective layer 14 can buffer the backlight component 12 to avoid the backlight component 12 from being worn or scratched by the flange portion 112. A thickness of the protective layer 14 may be determined according to actual needs, and the embodiments of the present disclosure do not limit this. For example, the thickness of the protective layer 14 may range 0.2~0.5 mm, such as 0.2 mm, 0.25 mm, 0.3 mm, 0.35 mm, 0.4 mm, 0.45 mm or 0.5 mm, etc. In this thickness range, the protective layer 14 is thinner and has sufficient cushioning protection.

In related art, the display unit is usually provided with only a monolithic back shell. In the assembly process of the display device, components, such as a motherboard, power supply, speaker, are required to be directly installed on corresponding areas on the back of the display module. Then the back shell aims the corresponding position on the display module to cover and protect these devices. In this way, the installation of components such as motherboard, power supply, and speaker, as well as the installation of the back shell, need to be concentrated in the assembly link of the whole machine involving the display module, resulting in a complicated and lengthy assembly process and low assembly efficiency.

As shown in FIG. 1-FIG. 6, in some embodiments, the display device 1 may also include a plurality of back shells 20. The display module 10 has a display surface 131 and a rear surface 114 that are relative to each other. The display surface 131 is used to display images. The rear surface 114 of the display module 10 is provided with a plurality of device mounting areas 115, and each device installation area 115 can be configured to install at least one device. The type of device can be determined according to the actual needs, and can include the motherboard 50, the power supply 60, and the speaker 70.

A plurality of backshells 20 correspondingly are arranged in a plurality of device mounting areas 115, so that each device mounting area 115 can be covered by a backshell 20, and backshells 20 and its corresponding device mounting areas 115 are enclosed to form a device mounting cavity. The backshell 20 is provided with a device mounting section, and the device mounting section can be configured to mount at least one device. In this way, the aforesaid device can be mounted on the corresponding back shell 20 first, and then the subsequent shell 20 is installed together with the rear surface 114 of the display module 10.

Compared with related technologies, the display device 1 provided in the present disclosure adopts a plurality of backshells 20; in this way, a plurality of component installation processes can be arranged, and the required devices such as motherboard 50, power supply 60, speaker 70 are pre-installed to the device installation portion of corresponding backshell 20, and then each backshell 20 that has been installed with corresponding devices is installed to the corresponding device installation area 115 when the whole machine is assembled, so that the rationality of the installation process is increased, and the whole machine assembly process is simplified. The component installation process and the whole machine installation process are relatively simple, so that the proficiency and efficiency of the assembly personnel of the corresponding process can be guaranteed, so as to improve the assembly efficiency of the whole machine.

The setting position of the device mounting area 115 on the display module 10 may be determined according to actual needs, and the embodiments of the present disclosure do not limit this. In some embodiments, the device mounting area 115 may be formed on the side of the backplate 11 away from the display surface 131. In some embodiments, a plurality of device mounting areas 115 may be arranged in the downside area of the display module 10 along its height direction, and a plurality of device mounting areas 115 are sequentially arranged along the width direction of the display module 10. The lower side area of the display module 10 is more spacious, and the aforesaid device is arranged in the lower side area of the display module 10, so that the space utilization efficiency can be improved, the thickness of the display device 1 can be avoided from increasing significantly, and the display device 1 has a thinner effect. In some embodiments, one side edge of the back shell 20 is flush with the lower edge of the display module 10 along its height direction. In this way, the display device 1 can be made to have a relatively flat lower side edge, and the overall layout is relatively neat.

In some embodiments, the surface of one side of the back shell 20, which is far away from the display surface 131, can be on a plane or a curved surface with the rear surface 114 of the display module 10. In this way, the back shell 20 as a whole can not be protruded from the rear surface 114 of the display module 10, on the one hand, the back shell 20 is avoided to hinder the heat dissipation of the display module 10, and the rear surface 114 of the display device 1 can be guaranteed on the other hand, and the appearance structure is neat, and it has a better appearance effect.

As shown in FIG. 1 and FIG. 4, in some embodiments, the display device 1 may also include a side frame 30. The display module 10 has a periphery surface connecting the display surface 131 and the back surface 114. The side frame 30 can be arranged on the periphery surface of the display module 10 and at the edge of the display surface 131. The side frame 30 can structurally support and protect the display module 10 to form a part of the appearance of the display device 1. In some embodiments, the side frame 30 can be connected to the back shell 20. For example, the side frame 30 can be set only in a local area on the periphery surface of the display module 10.

As shown in FIG. 4, in some embodiments, the display device 1 may also comprise a driving circuit 41 and a heat-dissipating sheet 40. The driving circuit 41 can be arranged on the display module 10 and is configured to drive the display module 10 to display images. For example, the driving circuit 41 can be an integrated circuit chip (IC). The heat-dissipating sheet 40 is arranged between the driving circuit 41 and the side frame 30. The heat generated when the driving circuit 41 is working is dissipated, so that the driving circuit 41 is kept in a better temperature range.

The heat-dissipating sheet 40 can be made of a vaporizing material which may be selected from one or more of graphite sheets, graphene films, thermally conductive coating materials, ceramic materials, thermally conductive gels, and phase change materials. Compared with the heat dissipation mode of the metal heat sink, the display device 1 provided in the embodiment of the present disclosure adopts a heat-dissipating sheet 40 for heat dissipation, and the thickness of the heat chamber layer 40 is thinner, so that the size of the display device 1 in the height direction can be avoided from being significantly increased, and the size of the side frame 30 in the height direction of the display device 1 is compressed, so as to save space and increase the screen-to-body ratio.

As shown in FIG. 6, in some embodiments, the back shell 20 and the side frame 30 can be connected by snapping. For example, the back shell 20 can be provided with the male buckle part, and the side frame 30 can be provided with the female buckle part. The male buckle part and the female buckle part are connected with the buckle and make the back shell 20 fixed. For example, the rear shell 20 can be provided with the female buckle part, and the side frame 30 can be provided with the male buckle part, and the female buckle part and the male buckle part are connected with the buckle and make the back shell 20 fixed.

The above is a detailed introduction to the display device provided by the embodiment of the present disclosure, and the principle and embodiment of the present disclosure are expounded in this article by applying specific examples, and the description of the above embodiment is only used to help understand the method and core idea of the present disclosure. At the same time, for those skilled in the art, according to the idea of the present disclosure, there will be changes in the specific embodiment and the scope of application. In summary, the content of the present specification should not be construed as a restriction on the present disclosure.

What is claimed is:

1. A display device comprising a display module, the display module comprising a backplate that comprises: a first accommodating portion configured to accommodate a backlight component; and a second accommodating portion, stacked on and connected with the first accommodating portion, configured to accommodate a liquid crystal screen,
wherein the display module has a display surface and a back surface that are relatively arranged; the back side of the display module is provided with a plurality of device mounting areas; the display device comprises a plurality of back shells correspondingly arranged in the plurality of device mounting areas; each of the back shells is provided with a device mounting portion, and the back shells and the device mounting area are enclosed to form a device mounting cavity.

2. The display device of claim 1, wherein the backplate comprises a bottom wall and a side wall thereon; an inner surface of the side wall is provided with a flange portion that is opposite to the bottom wall; the bottom wall and the side wall are enclosed to form an accommodating cavity, and the flange portion separates the accommodating cavity into the first accommodating portion and the second accommodating portion.

3. The display device of claim 2, wherein the flanging portion is bent along a direction close to the bottom wall to form a folding structure.

4. The display device of claim 3, wherein the liquid crystal screen is arranged on one side surface of the folding structure far away from the backlight component, and the liquid crystal screen and the folding structure are bonded through an adhesive.

5. The display device of claim 3, wherein a upper part of the flange portion facing the bottom wall has a plane structure.

6. The display device of claim 3, wherein the folding edge structure is left with a gap.

7. The display device of claim 3, wherein one side of the flange facing the bottom wall is provided with a protective layer which is made of a Mylar sheet, a plastic layer, a rubber layer and a sponge layer.

8. The display device of claim 2, wherein one side of the flange facing the bottom wall is provided with a protective layer which is made of a Mylar sheet, a plastic layer, a rubber layer and a sponge layer.

9. The display device according to claim 7, wherein a thickness of the protective layer ranges between 0.2 and 0.5 mm.

10. The display device of claim 1, wherein the plurality of device mounting areas are defined on one side of the backplate far away from the display surface.

11. The display device of claim 1, wherein the plurality of device mounting areas are arranged in the downside area of the display module along its height direction, and the plurality of device mounting areas are sequentially arranged along a width direction of the display module.

12. The display device of claim 11, wherein one side edge of the back shell and the lower edge of the display module along its height direction are flush.

13. The display device of claim 11, wherein the surface of one side of the back shell, far away from the display surface, and the back surface of the display module are shared in a plane or a curved surface.

14. The display device of claim 1, further comprising a side frame, wherein the display module has a periphery surface connecting the display surface and the back surface, and the side frame is arranged on a periphery of the display module and an edge of the display surface.

15. The display device of claim 14, wherein the side frame is only arranged in a local area on the periphery of the display module.

16. The display device of claim 14, wherein the back shell and the side frame are buckled and connected.

17. The display device of claim 14, further comprising a driving circuit arranged on the periphery of the display module and a heat-dissipating sheet arranged between the driving circuit and the side frame.

18. The display device of claim 17, wherein the heat-dissipating sheet is made of a soaking material selected from at least one of a graphite sheet, a graphene film, a thermally conductive coating material, a ceramic material, a thermally conductive gel, and a phase-change material (PCM).

19. The display device of claim 1, wherein the backlight component comprises a backlight source on the backplate, and an optical film on one side of the backlight that is far away from the backplate.

\* \* \* \* \*